(12) United States Patent
Maali et al.

(10) Patent No.: US 8,564,643 B1
(45) Date of Patent: Oct. 22, 2013

(54) CAMERA IMAGE GEOREFERENCING SYSTEMS

(75) Inventors: Fereydoun Maali, Scottsdale, AZ (US); Monroe M. Thomas, Calgary (CA)

(73) Assignee: Puretech Systems Inc., Phoenix, AZ (US)

( * ) Notice: Subject to any disclaimer, the term of this patent is extended or adjusted under 35 U.S.C. 154(b) by 0 days.

(21) Appl. No.: 13/559,534

(22) Filed: Jul. 26, 2012

Related U.S. Application Data

(62) Division of application No. 12/043,036, filed on Mar. 5, 2008, now Pat. No. 8,253,797.

(60) Provisional application No. 60/892,979, filed on Mar. 5, 2007.

(51) Int. Cl.
*H04N 13/02* (2006.01)

(52) U.S. Cl.
USPC .............. 348/46; 348/143; 348/144; 348/159

(58) Field of Classification Search
USPC .................................................. 348/46, 159
See application file for complete search history.

(56) References Cited

U.S. PATENT DOCUMENTS

| | | | |
|---|---|---|---|
| 5,059,789 A | 10/1991 | Salcudean | |
| 5,159,647 A | 10/1992 | Burt | |
| 6,512,857 B1 * | 1/2003 | Hsu et al. | 382/294 |
| 2004/0217884 A1 * | 11/2004 | Samadani et al. | 340/995.14 |
| 2005/0036036 A1 | 2/2005 | Stevenson et al. | |
| 2006/0093190 A1 | 5/2006 | Cheng et al. | |

FOREIGN PATENT DOCUMENTS

GB   WO03013140 A1   2/2003

\* cited by examiner

*Primary Examiner* — Tung Vo
*Assistant Examiner* — Obafemi Sosanya
(74) *Attorney, Agent, or Firm* — Stoneman Law Patent Group; Martin L. Stoneman

(57) ABSTRACT

A method for constructing a georeferencing-enabled camera model and its deployment in georeferencing targets located in video sequences due to a single video camera. A video surveillance camera is modeled by a collection of rays converging at a virtual camera point and the retina resolution cell coordinates associated with those rays wherein the ray equations are first established, in the course of a calibration process, for a given camera view, with the aid of other views of the same video surveillance camera, as necessary, and using such a model for mapping image coordinates to terrain coordinates and vice versa in the intended view or its adaptation for use in other views of the same video surveillance camera.

1 Claim, 9 Drawing Sheets

CAMERA IMAGE GEOREFERENCING SYSTEMS

CROSS-REFERENCE TO RELATED APPLICATION

The present application is a divisional application and is related to and claims priority from application Ser. No. 12/043,036, filed Mar. 5, 2008, entitled "CAMERA IMAGE GEOREFERENCING SYSTEMS", which application is related to and claims priority from prior provisional application Ser. No. 60/892,979, filed Mar. 5, 2007, entitled "GEO-REFERENCING VIDEO TRACKS", the contents of which are incorporated herein by this reference and are not admitted to be prior art with respect to the present invention by the mention in this cross-reference section.

BACKGROUND

This invention relates to providing a system for improved camera image georeferencing. More particularly, this invention relates to providing a system for constructing at least one georeferencing-enabled camera model and its deployment in georeferencing targets located in video sequences utilizing a single video camera.

The usefulness of video surveillance systems is becoming increasingly acknowledged as the demand for enhanced safety has increased. Areas commonly covered by such systems, include, for example, monitoring of harbors, airports, bridges, power plants, parking garages, public spaces, and other high-value assets. Traditionally, such camera networks require a labor-intensive deployment and monitoring by human security personnel. Human-monitored systems are, in general, relatively costly and prone to human error. For these reasons, the development of technology to automate the deployment, calibration, and monitoring of such systems will be increasingly important in the field of video surveillance.

For example, in automated video surveillance of sensitive infrastructures, it is always desirable to detect and alarm in the event of intrusion. To perform such a task reliably, it is often helpful to classify detected objects beforehand and to also track such detected objects with a view to discern an actual threat from the underlying events and activities. In the absence of geo-referencing, which brings about the capability of relating image coordinates to those in the underlying scene, the video surveillance entity will not have a notion of real size of the detected objects in image space. The acquisition of real size data for detected objects is important to determining potential targets from benign objects. Moreover, absence of geo-referencing precludes having a notion of true kinematics of the target, including a target's real velocity and acceleration. Additionally, georeferencing with a single camera, demands the presence of landmark-rich scene which may not be forthcoming in many instances, such as in the surveillance of ports and harbors, or when a site is being remotely monitored and it is not feasible to introduce synthetic landmarks into the scene. Clearly, in reference to the above-described issues, the development of systems to improve the efficiency and effectiveness of automated video surveillance would be of benefit to many.

OBJECTS AND FEATURES OF THE INVENTION

A primary object and feature of the present invention is to provide a system addressing the above-mentioned issues.

It is a further object and feature of the present invention to provide such a system enabling construction of a georeferencing-enabled camera model and its deployment to georeference located targets in camera space of video sequences derived from a single camera. The preferred georeferencing-enabled camera model of the system preferably uses a single Pan-Tilt-Zoom (PTZ)-enabled camera, with the preferred georeferencing-enabled camera model comprising a set of rays that emanate from (or converge at) a virtual camera point and the associated camera-space pixel coordinates of such rays.

It is another object and feature of the present invention to provide such a system to enable deployment of such a georeferencing-enabled camera model not only for the scene for which it was created but also for new views of the same camera (contingent on availability of a minimum set of landmarks whose coordinates can be determined both in object and camera spaces).

It is a further object and feature of the present invention to provide such a system useful in constructing a georeferencing-enabled camera model for scenes or camera views that do not exhibit a desired number or spatial dispersion of landmarks across the scene.

It is another object and feature of the present invention to provide such a system that addresses optical nonlinearities and aberrations existing in a camera view, by translating such nonlinearities and aberrations into at least one lookup table that preferably relates image-pixel coordinates to rays in three-dimensional space. Preferably such image-pixel coordinates are associated with terrain points in a terrain, via at least one calibration process.

It is an additional object and feature of the present invention to provide a notion of real size of detected objects and kinematics of such objects.

It is a further object and feature of the present invention to provide such a system useful in the field of video monitoring and surveillance, as described below.

A further primary object and feature of the present invention is to provide such a system that is efficient, cost-effective, and practical. Other objects and features of this invention will become apparent with reference to the following descriptions.

SUMMARY OF THE INVENTION

In accordance with a preferred embodiment hereof, this invention provides a method related to deriving at least one camera model, usable for security surveillance in at least one underlying terrain, for georeferencing pixel coordinates in a camera view of a single security surveillance camera, the camera view being deficient of located landmarks in sufficient number or desired dispersion to produce such at least one camera model, such method comprising the steps of: obtaining, from the single security surveillance camera, a principal camera image comprising a principal view of the at least one underlying terrain, the principal view comprising at least two located landmarks; for each one of the at least two located landmarks of the principal view, producing a node associating the physical coordinates of the located landmark in the at least one underlying terrain to pixel coordinates in the principal camera image; generating a principal nodelist comprising all available principal nodes of the principal view; obtaining from the single security surveillance camera, at least one auxiliary camera image comprising at least one auxiliary view of the at least one underlying terrain, the at least one auxiliary view comprising a plurality of located landmarks; for each located landmark of such plurality of located landmarks, producing a node associating the physical coordinates of the located landmark in the at least one underlying terrain to pixel coordinates in the auxiliary camera image; generating at least one auxiliary nodelist comprising all available nodes of the at least one auxiliary view; deriving from both the principal nodelist and the at least one auxiliary nodelist, at least two alignment nodes, each one exhibiting respectively the same pixel coordinates in the auxiliary camera image as the pixel coordinates in the principal camera image; geometrically aligning the principal view to the at least one auxiliary view through the pairing of the at least two alignment nodes of the principal nodelist and the at least one auxiliary nodelist, generating an augmented principal nodelist by adding the nodes of the at least one auxiliary nodelist to the principal nodelist using a first set of geometrical computations; wherein the augmented principal nodelist comprises at least one enlarged set of located landmarks associated with the principal view; and using the augmented principal nodelist, obtaining such at least one camera model by at least one second set of geometrical computations; wherein such at least one camera model, usable for security surveillance in at least one underlying terrain, may be achieved.

Moreover, it provides such a method further comprising the step of, using such at least one camera model and geographical data representing the underlying terrain, mapping image coordinates to terrain coordinates by at least one third set of geometrical computations. Additionally, it provides such a method further comprising the step of recording for the principal view, positional data relating to the physical position of the single security surveillance camera in object space, such positional data enabling subsequent reacquisition of the principal view by the single security surveillance camera. Also, it provides such a method wherein: such positional data comprises at least one camera-pan setting and at least one camera-tilt setting; and a substantially constant camera zoom setting of the single security surveillance camera is maintained in the principal view and the at least one auxiliary view. In addition, it provides such a method, wherein an above step further comprises the steps of: locating within the principal nodelist a first principal alignment node associated with a first one of the at least two located landmarks of the principal view; locating within the principal nodelist a second principal alignment node associated with a second one of the at least two located landmarks of the principal view; and deriving from the auxiliary nodelist, at least one auxiliary alignment node set comprising a first auxiliary alignment node exhibiting the same pixel coordinates in the auxiliary camera view as the first principal alignment node in the principal camera view, and a second auxiliary alignment node exhibiting the same pixel coordinates in the auxiliary camera view as the second principal alignment node in the principal camera view.

In addition, it provides such a method, wherein such at least one auxiliary alignment node set of the above step may be completed by the steps of: locating within the at least one auxiliary camera view at least three nodes that together yield a triangular element encompassing the pixel coordinates of at least one of the at least two alignment nodes of the principal camera image; and providing, by interpolation, a virtual alignment node exhibiting the same pixel coordinates as the at least one of the at least two alignment nodes of the principal camera image.

Further, it provides such a method, wherein such above step further comprises the steps of: for an auxiliary camera view lacking such at least two alignment nodes, locating within either of the principal camera view and the at least one auxiliary camera view at least three nodes of a respective camera view that together yield a triangular element encompassing the pixel coordinates of a located alignment node of the other view; providing, by interpolation, a virtual alignment node corresponding to the alignment node, such corresponding virtual alignment node exhibiting the same pixel coordinates as such alignment node of the other view; The method, wherein such first set of geometrical computations further comprises the steps of: forming at least two rays extending from a virtual camera point to each such at least two alignment nodes of the principal nodelist and the at least one auxiliary nodelist; intersecting such at least two rays by a sphere of fixed arbitrary radius, centered on the virtual camera point, to generate a plurality of ray-end points, such plurality of ray-end points comprising a first ray-end point and a second ray-end point in the auxiliary view, and a third ray-end point and a fourth ray-end point in the principal view; selecting within the auxiliary nodelist a tertiary node to be added as a corresponding tertiary node to the primary nodelist; defining the tertiary node as the intersection of an intersecting sphere-set comprising three spheres respectively centered on the first ray-end point, the second ray-end point, and the virtual camera point, wherein each sphere of the first intersecting sphere-set comprise radii equal to a distance extending from their centers to the tertiary point in the auxiliary view; applying to the principal view, a second intersecting sphere-set comprising three corresponding spheres respectively centered on the third ray-end point, the fourth ray-end point, and the virtual camera point, wherein each respective corresponding sphere of the second sphere set comprise radii equal to the spheres of the first intersecting sphere-set; identifying at least one possible tertiary point in the principal view by locating the resulting intersections of the three corresponding spheres of the second intersecting sphere-set; confirming the corresponding tertiary point in the principal view using the signed distance of the at least one possible tertiary point from a plane formed by the virtual camera point and the plurality of ray-end points in the auxiliary view and the principal view to disambiguate the result; adding the resulting corresponding tertiary point to the principal nodelist; and generating an augmented principal nodelist by repeating the above group of steps for all other nodes in the auxiliary nodelist. Even further, it provides such a method wherein such at least one second set of geometrical computations comprises the steps of: inputting the augmented principal nodelist to at least one triangular mesh generation operation to output a set of triangular elements, each triangular element of the set comprising non-intersecting sides; generating at least one triangular element list comprising the set of triangular elements; computing ray equations, in three-dimensional space, for nodes associated with each vertex of each triangular element of the set of triangular elements, each resulting ray comprising coordinates of the virtual camera point and coordinates of a respective vertex; and generating such at least one camera model by for the principal camera view, analyzing each resolution cell of the principal camera image to determine, for each associated pixel coordinates, the existence of an encompassing triangular element in the triangular element list, the encompassing triangular element comprising such associated coordinates, and deriving for each such resolution cell comprising a respective encompassing triangular element, an equation for a ray, through at least one interpolation of the rays derived for the vertices of the respective encompassing triangular element, wherein such interpolation is influenced by proximity of the resolution cell to the vertices of the respective encompassing triangular element.

Moreover, it provides such a method further comprising the steps of: using such at least one camera model in combination with geographical data representing the underlying terrain and at least one third set of geometrical computations to map image coordinates to terrain coordinates; and recording in at least one lookup table, for each located terrain point, such terrain point coordinates and such range; wherein such at least one third set of geometrical computations comprises the steps of for each ray of the at least one camera model, locating a terrain point in the object space, wherein each such terrain point comprises the intersection of a ray with the underlying terrain, and for each such terrain point located, calculating in the object space terrain point coordinates and a range of such terrain point coordinates from the virtual camera point.

Additionally, it provides such a method further comprising the steps of generating at least one (X,Y,Z,R) lookup table for such at least one camera model. Also, it provides such a method of claim 9 further comprising the step of reducing off-line processing requirements by deferring the steps subsequent to such generating of the augmented principal nodelist to on-line operation. In addition, it provides such a method wherein step (b) further comprises the steps of: generating, for the augmented principal nodelist, at least two triangular element lists; wherein each of such at least two triangular element lists comprises a different initial exterior point of the convex hull, in camera space, of the augmented principal nodelist; locating, within each of such at least two triangular element lists, encompassing triangular elements comprising an excessively large angle; for each such encompassing triangular element comprising the excessively large angle, replacing such encompassing triangular element with an encompassing element from an alternative element list of such at least two triangular element lists; wherein the quality of encompassing triangular elements resulting from the at least one triangular mesh generation operation may be improved. And, it provides such a method further comprising the steps of: identifying, in camera space, a target blob comprising a discrete region of camera space associated with at least one target of the camera view; determining for the target blob, at least one blob attribute in camera space, such at least one blob attribute at least comprising pixel coordinates of a lowest blob point and pixel coordinates of a blob centroid point; mapping the pixel coordinates of such lowest blob point to a terrain point using such at least one camera model; computing a range value, R_low, comprising the distance from such terrain point to the virtual camera point; associating the same range value R_low to the blob centroid point; intersecting the ray extending through the pixel coordinates of the blob centroid point with a sphere centered on the virtual camera point and comprising a radius equal to R_low, disambiguating the result by selecting from at least one resulting intersection of such ray, a ray-end point that exhibits the lowest Z coordinate value, wherein coordinates of such ray-end point comprise the location of the at least one target in object space.

Further, it provides such a method further comprising enabling georeferencing of the at least one target in object space, in a plurality of time-stamped frames of at least one georeferencing-enabled video sequence, to provide estimated true kinematics of the at least one target in object space. Even further, it provides such a method further comprising the steps of: identifying, in camera space, at least one target blob comprising a discrete region of camera space associated with at least one target of such camera view; determining for the at least one target blob, at least one blob attribute in camera space, such at least one blob attribute at least comprising pixel coordinates of a lowest blob point and pixel coordinates of a target bounding box comprising at least four corners; mapping the pixel coordinates of such lowest blob point to a terrain point using such at least one camera model; computing a range value, R_low, comprising the distance from such terrain point to the virtual camera point; assigning the range value R_low to the at least four corners of the target bounding box; generating a spherical quadrilateral by intersecting the rays associated with the at least four corners of the target bounding box by a sphere of radius R_low and centered on the virtual camera point, such spherical quadrilateral comprising a spherical quadrilateral area; disambiguating the intersections of sphere and such rays above, by selecting from resulting intersections of such rays such intersections exhibiting lower Z coordinate value; determining in camera space, the number of pixels in the target bounding box, and the number of pixels claimed by the at least one target blob; computing for the object space, a mean frustum area associated with each pixel; wherein such computing comprises the dividing of such spherical quadrilateral area by the number of pixels in the target bounding box and multiplying the number of pixels claimed by the at least one target blob in camera space by an equivalent mean frustum area associated with each pixel; and wherein an approximation of real size of such at least one target in object space may be achieved.

In accordance with another preferred embodiment hereof, this invention provides a method related to georeferencing at least one target, of a camera view of a security surveillance camera, such camera view comprising an associated georeferencing-enabled camera model, such camera model relating image pixel-coordinates of the camera view to rays in three-dimensional space, relative to a virtual camera point, such method comprising the steps of: identifying, in camera space, a target blob comprising a discrete region of camera space associated with the at least one target of the camera view; determining, for the target blob, at least one blob attribute in camera space, such at least one blob attribute at least comprising pixel coordinates of a lowest blob point and pixel coordinates of a blob centroid point; mapping the pixel coordinates of such lowest blob point to a terrain point using such georeferencing-enabled camera model; computing a range value, R_low, comprising the distance from such terrain point to the virtual camera point; associating the same range value R_low to the blob centroid point; intersecting the ray extending through the pixel coordinates of the blob centroid point with a sphere centered on the virtual camera point and comprising a radius equal to R_low, disambiguating the result by selecting from at least one resulting intersection of such ray, a ray-end point that exhibits the lowest Z coordinate value, wherein coordinates of such ray-end point comprise the location of the at least one target in object space. Even further, it provides such a method further comprising enabling georeferencing of the at least one target in object space, in a plurality of time-stamped frames of at least one georeferencing-enabled video sequence, to provide estimated true kinematics of the at least one target in object space.

In accordance with another preferred embodiment hereof, this invention provides a method related to arriving at an approximation of a real size of a target, of a camera view of a security surveillance camera, such camera view comprising an associated camera model, such camera model relating image pixel-coordinates of the camera view to rays in three-dimensional space, relative to a virtual camera point, such method comprising the steps of: identifying, in camera space, at least one target blob comprising a discrete region of camera space associated with the at least one target of such camera view; determining, for the at least one target blob, at least one blob attribute in camera space, such at least one blob attribute at least comprising pixel coordinates of a lowest blob point and pixel coordinates of a target bounding box comprising at least four corners; mapping the pixel coordinates of such lowest blob point to a terrain point using such associated camera model; computing a range value, R_low, comprising the distance from such terrain point to the virtual camera point; assigning the range value R_low to the at least four corners of the target bounding box; generating a spherical quadrilateral by intersecting the rays associated with the at least four corners of the target bounding box by a sphere of radius R_low and centered on the virtual camera point, such spherical quadrilateral comprising a spherical quadrilateral area; disambiguating the intersections of sphere and such rays above, by selecting from resulting intersections of such rays such intersections exhibiting lower Z coordinate value; determining in camera space, the number of pixels in the target bounding box, and the number of pixel spanned by the at least one target blob; computing for the object space, a mean frustum area associated with each pixel; wherein such computing step comprises the dividing of such spherical quadrilateral area by the number of pixels in the target bounding box and multiplying the number of pixels claimed by the at least one target blob in camera space by an equivalent mean frustum area associated with each pixel.

In accordance with another preferred embodiment hereof, this invention provides a method, related to assisting camera-handoff between at least two georeferencing-enabled cameras comprising a source camera, a destination camera, at least one georeferencing-enabled camera model comprising at least one (X,Y,Z,R) lookup table, such at least two georeferencing-enabled cameras usable for security surveillance in at least one underlying terrain, such method comprising the steps of: georeferencing at least one target trajectory determined in object space of the source camera; communicating the at least one georeferenced target trajectory of the source camera to the destination camera such that the destination camera can calculate at least one row and at least one column number of a resolution cell in the (X,Y,Z,R) lookup table that exhibits the closest three-dimensional point to the respective point of such communicated trajectory; wherein such communicating assists reacquisition of the at least one target in camera space of the destination camera.

In accordance with another preferred embodiment hereof, this invention provides a method of adapting an existing georeferencing-enabled camera model derived for a given camera view of a single security surveillance camera, to a new camera view of the single security surveillance camera, such existing georeferencing-enabled camera model relating image pixel-coordinates of the given camera view to rays in three-dimensional space, relative to a virtual camera point, such method comprising the steps of: locating in the new camera view a minimum of two located landmarks to be used for alignment of the given camera view with the new camera view, such minimum of two located landmarks comprising a first located landmark and a second located landmark; deriving for the new camera view, ray equations associated with the first located landmark and the second located landmark, such ray equations outputting two respective rays; intersecting each such two respective rays, along with all such rays of the existing georeferencing-enabled camera model, by a sphere of arbitrary radius and centered on the virtual camera point to yield a first ray-end point and a second ray-end point respectively located at the end of each such two rays; locating in the given camera view two corresponding ray-end points, each one associated with the same pixel coordinates to those of first ray-end point and a second ray-end point respectively; locating in the given camera view a third ray-end point comprising the intersection of a first intersecting sphere-set comprising three spheres respectively centered on the first ray-end point, the second ray-end point, and the virtual camera point, wherein each sphere of the first intersecting sphere-set comprise radii equal to a distance extending from their centers to the third ray-end point in the given view; using a second intersecting sphere-set to calculate a corresponding third ray-end point in the new camera view, the second intersecting sphere-set comprising three corresponding spheres respectively centered on the two corresponding ray-end points and the virtual camera point, wherein each corresponding sphere of the second intersecting sphere-set comprise radii equal to the respective spheres of the first intersecting sphere-set; locating in the new view at least one corresponding third ray-end point along with its associated pixel coordinates in the new view; confirming the corresponding third ray-end using the signed distance of the corresponding third ray-end to a plane formed by the virtual camera point and the two corresponding ray-end points of the new view and the third ray-end point to a plane formed by the first ray-end point, the second ray-end point, and the virtual camera point; and deriving such georeferencing-enabled camera model by repeating steps (e) through (h) for all other ray-end points of such given view; wherein adaptation, of such existing georeferencing-enabled camera model derived for a given camera view to a new camera view, may be achieved.

In accordance with another preferred embodiment hereof, this invention provides a method, related to deriving at least one camera model, usable for security surveillance in at least one underlying terrain, for georeferencing pixel coordinates in a camera view from a virtual camera point of a single security surveillance camera, wherein the georeferencing-enabled camera model comprises at least one lookup table linking the image pixel coordinates of the camera image to rays in three-dimensional space that in turn lead to corresponding points on an underlying terrain, such method comprising the steps of: obtaining from the single security surveillance camera, a selected camera view of the underlying terrain, such selected camera view comprising an associated camera image; recording zoom settings of the single security surveillance camera, while retaining a substantially constant zoom setting throughout the operation with such operation extending to model construction and deployment for a selected camera view of the single security surveillance camera; creating a nodelist comprising a collection of nodes, wherein each node comprises an abstraction of coordinates of a landmark in the at least one underlying terrain along with corresponding image pixel coordinates of such landmark; generating an element list by inputting the nodelist, to at least one triangular mesh generation operation, in camera space, such at least one triangular mesh generation operation yielding triangular elements with non-intersecting sides; computing ray equations in three-dimensional space for nodes associated with the vertices of the triangular elements; and constructing the camera model for such selected camera view by scanning across each resolution cell of the associated camera image and determining for each pixel coordinates an encompassing triangular element in the element list, and for each such encompassing triangular element located, deriving an equation for a ray associated with the virtual camera point and the pixel coordinates of that resolution cell encompassed by such encompassing triangular element, through at least one interpolation of rays associated with vertices of such encompassing element, with such at least one interpolation being influenced by proximity of such resolution cell to the vertices of such encompassing triangular element.

DETAILED DESCRIPTION OF THE BEST MODES AND PREFERRED EMBODIMENTS OF THE INVENTION

Figure 1:
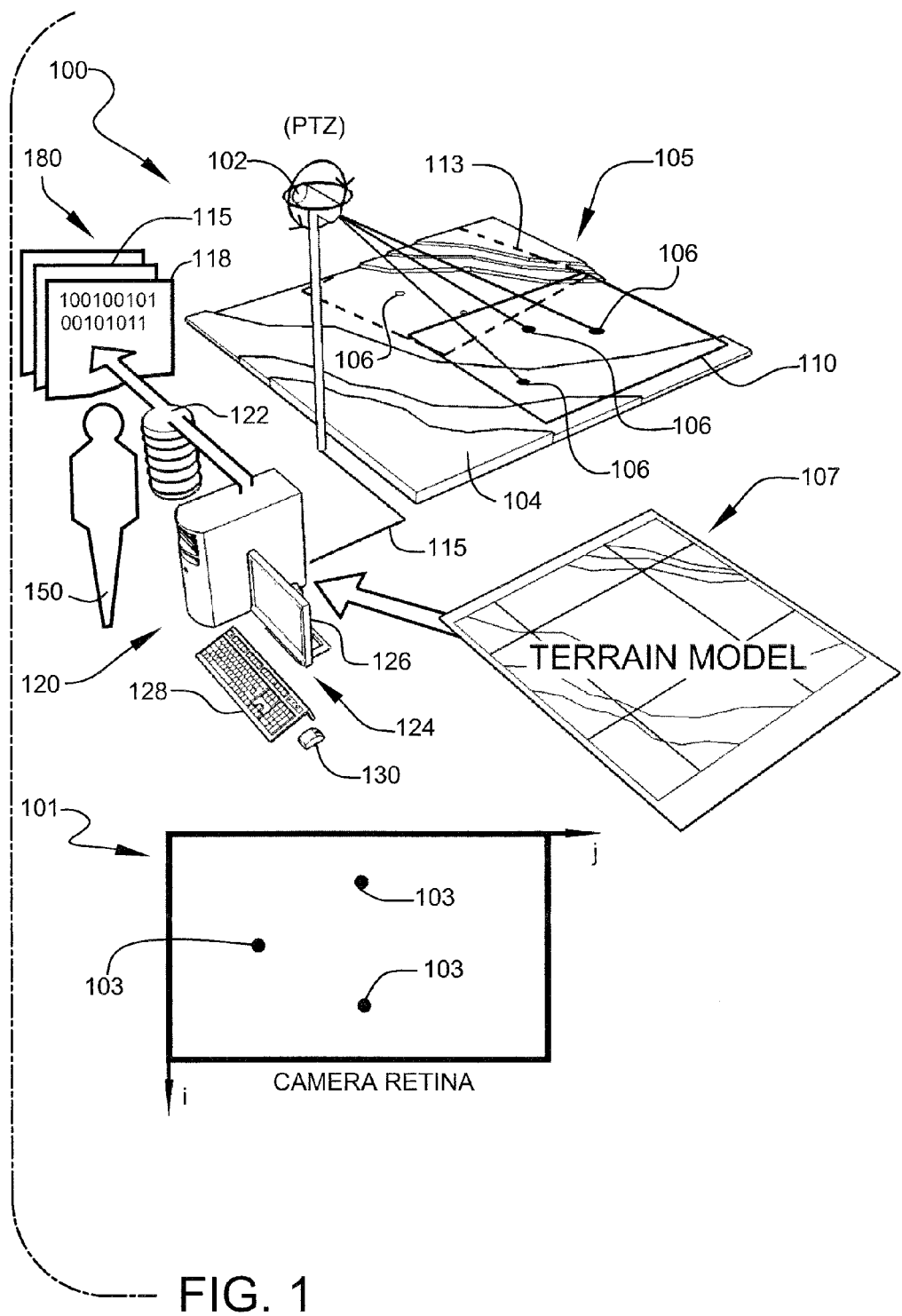
FIG. 1 shows a high-level schematic diagram illustrating a preferred configuration for implementating a georeferencing system, to enable construction of a camera model used in georeferencing targets of a scene, according to the preferred embodiments of the present invention.

FIG. 1 shows a high-level schematic diagram illustrating a typical configuration for implementing georeferencing system 100, according to a preferred embodiment of the present invention. Preferred embodiments of georeferencing system 100 preferably enable construction of at least one camera model 180, through a preferred calibration process, and deployment of resulting models for georeferencing targets located in camera space 101. Camera space, as intended in this disclosure, is a two-dimensional abstraction of the physical terrain as imaged by the "retina" of camera 102, and in this disclosure comprises a left-handed coordinate system with its origin at the top left-hand corner of the image. It is noted that camera space, image space, pixel space, and retina space are used interchangeably throughout this disclosure. Conversely, the term objects space, as used herein, describes a frame of reference associated with the physical world. Object space, terrain space, geospatial space are used interchangeably throughout this disclosure. Georeferencing, as intended here, is concerned with the mapping of such image pixel coordinates 103 of a camera image to terrain coordinates in object space. It is noted that such terrain coordinates of a scene may preferably include landmarks, such as, physical objects, structures, natural features, etc. of known or locatable geographic coordinates.

Simply stated, a preferred camera model 180 of georeferencing system 100 comprises a set of rays that emanate from or converge at a virtual camera point and their associated camera space pixel coordinates. Camera model generation of georeferencing system 100, preferably utilizes coordinate data for terrain points 106. Such coordinate data is preferably extracted from one or more local rectangular maps (terrain models 107), commonly derived from Geographic Information System (GIS) maps, which are increasingly available for many outdoor scenes across the United States and elsewhere. Digital Elevation Models (DEMs) are one preferred example of such data. Alternately preferably, terrain models may be derived through local geographical surveys. Moreover, such preferred resources may incorporate elevation models that perform approximations based on variety of surface primitives. It is further noted that in yet another alternate preferred method of georeferencing system 100, camera model generation may utilize coordinate data derived from a previously generated camera model, through preferred camera-model "adaptation" processes described in a later section of the disclosure.

In many video surveillance and monitoring environments, some camera views of interest are likely to be landmark deficient; that is, their scenes may not offer physical landmarks in sufficient number or desired spatial distribution. One problem that georeferencing system 100 preferably resolves is that of deriving at least one suitable camera model 180, for each such deficient camera view, preferably through the use of physical landmarks derived from additional camera views of such an underlying terrain.

Accordingly, it is preferred that camera 102 be capable of altering its view of underlying terrain 105 from the principal region of interest, identified herein as primary region 110 (diagrammatically depicted by a solid boundary line overlying terrain 104) to at least one auxiliary region 113 (diagrammatically depicted by a dashed boundary line overlying terrain 104). Such a change in the camera position is intended to acquire a view of auxiliary region 113 that preferably contains additional locatable landmarks. Such auxiliary landmarks may be used to augment the view associated with primary region 110. Such auxiliary landmarks may be associated with the above-noted terrain points 106, as shown, or may comprise interpolated points in camera space.

A preferred implementation of georeferencing system 100 utilizes a single camera having Pan-Tilt-Zoom (PTZ) capability, thus enabling camera 102 to acquire different views commensurate with its pose (i.e., attitude in space) and magnification of its lens. Preferably, landmarks derived from auxiliary views are utilized to construct a suitable camera model 180 for the principal view of interest, as described in FIG. 2. Camera models 180 of georeferencing system 100, by assuming a virtual camera point for all views of camera 102, essentially ignores any translation that the "retina," of camera 102, may undergo in the course of rotation of camera 102. Such translation or parallax is minute compared with camera-to-target distances, and hence is preferably considered inconsequential for the purposes described herein.

Preferably georeferencing system 100 efficiently manages landmark deficient scenes such as encountered in monitoring of shipping harbors (and other outdoor video surveillance applications). A well-scattered set of landmarks for a given position of camera 102 (or pose of camera 102) may not be available when viewing such shipping harbors. Thus, preferably, once camera model 180 is generated for such a landmark deficient scene, georeferencing system 100 can deploy camera model 180 to georeference image-pixel coordinates 103, as described below.

Furthermore, it is noted that camera model 180, generated by georeferencing system 100, is often later useable not only for the scene for which it was created, but also for new views by camera 102. As a result, georeferencing system 100 provides a preferred means for remotely constructing camera model 180.

Preferably, for a given view of camera 102, georeferencing system 100 advances three basic routes to arriving at a suitable camera model 180 associated with a given view. First, a suitable camera model 180 may be generated by relying on an adequate number and distribution of distinct landmarks within a viewed scene of a primary camera view. Secondarily, subject to presence of a minimal number of landmarks, and some additional constraints addressed in later sections, a suitable camera model 180 may be developed using landmarks derived from one or more secondary views of camera 102. As noted above, these supplementary or "auxiliary" landmarks are preferably used to augment landmarks in an intended view of camera 102. In the third preferred route, subject to presence of at least two landmarks, camera model 180 previously derived for another view of camera 102 may be adapted to an intended view by the same camera 102.

Preferably, camera-model building and deployment within georeferencing system 100 is generally implemented by executing one or more programs 118 on a general purpose computer 120. Preferably, computer 120 contains a central processing unit (CPU) and associated circuitry, memory 122, and a variety of input/output (I/O) devices 124 to provide at least one computer/user interface with user 150. The I/O devices 124 preferably comprise devices of the sort well known in the art. For example, computer 120 preferably comprises a display screen or monitor 126, keyboard 128, mouse 130, etc. Preferably, memory 122 stores program 118 (or programs) of georeferencing system 100 that are executed to enable the preferred methods and processes described herein. Alternately preferably, camera 102 may preferably comprise an embedded processor structured and arranged to run at least one local implementation of the above-described program or programs. Such "smart" cameras preferably comprise an embedded hardware arrangement substantially equivalent to the remote system architectures noted above. However, such embedded systems may, in some implementations, comprise minimum or reduced system resources. Preferably, the storage and processing capacity within the hardware environment is addressed in georeferencing system 100 by reserving some georeferencing processes to runtime operation, as described in a later section.

Preferably, when a preferred computing platform executes such a program, it becomes a special-purpose device and thus an integral portion of georeferencing system 100. In a preferred arrangement, camera control along with data acquisition occurs via a series of signal links 115, preferably extending between camera 102 and computer 120, as shown. Upon reading the teachings of this specification, those of ordinary skill in the art will now understand that, under appropriate circumstances, considering such issues as user preference, intended use, etc., other hardware/software arrangements, such as the use of network interfaces, wireless network communication, network firewalls, interne connections, security encryptions, "system on chip" architectures, data-logging capabilities, special image processing, etc., may suffice.

Figure 2:
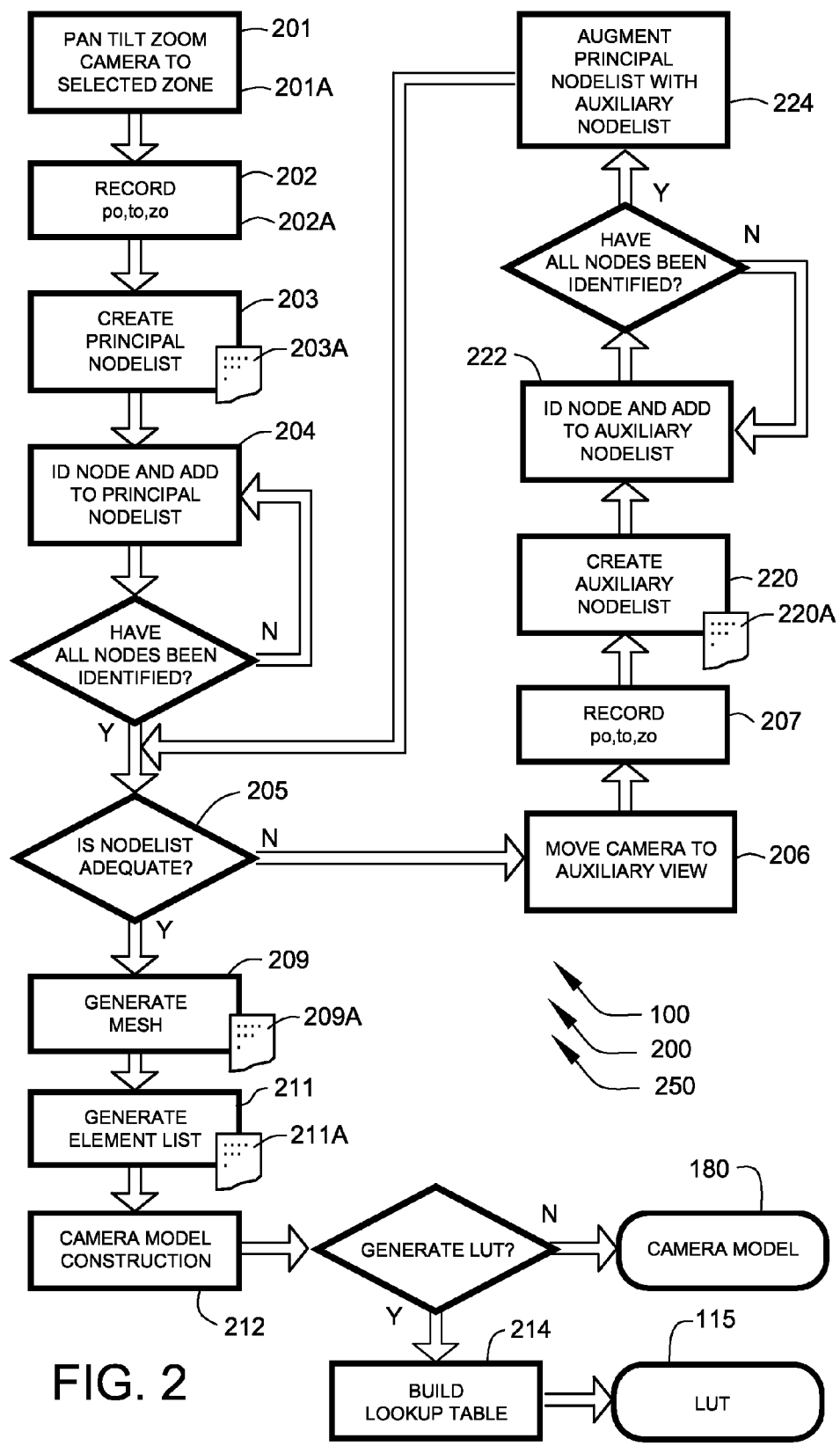
FIG. 2 shows a high-level schematic diagram illustrating preferred steps involved in constructing a camera model, for a scene to be monitored, when landmarks contained in a scene are insufficient or not well scattered over the scene, according to a preferred embodiment of the present invention.
Figure 3:
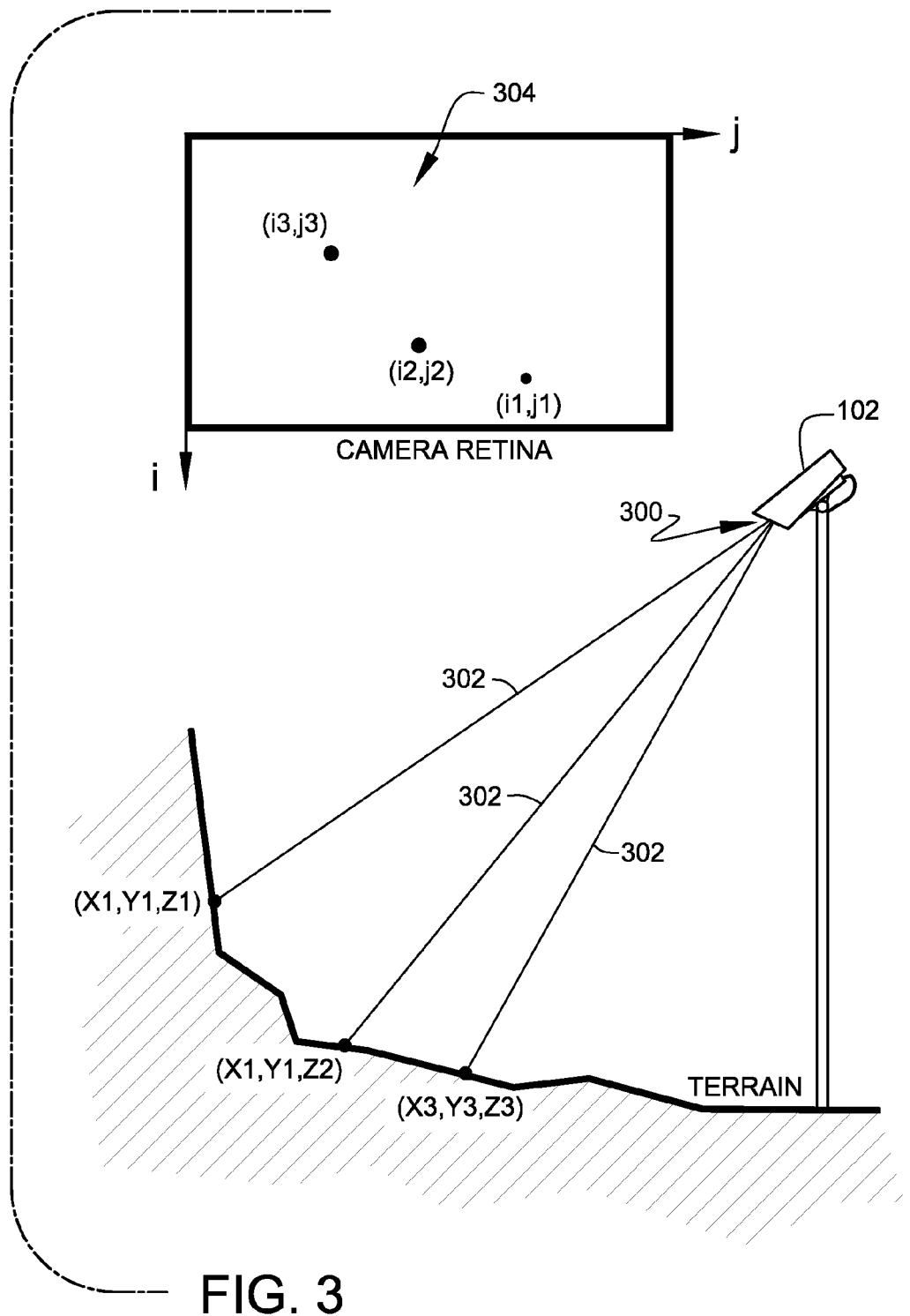
FIG. 3 is a diagrammatic depiction of a set of three rays formed from a single camera point, the rays associating three landmarks: (X1,Y1,Z1), (X2,Y2,Z2) and (X3,Y3,Z3) with their corresponding image coordinates (i1, j1), (i2, j2) and (i3,j3) in the camera space, according to the preferred embodiment of FIG. 2.

Preferred steps leading to construction of a model for landmark-deficient scenes are presented in method 200 of FIG. 2. Method 200 preferably enables a subsequent preferred deployment of camera model 180, for the intended scene, and other scenes/camera views, for georeferencing objects (essentially points located in camera space). FIG. 3 is a diagrammatic depiction of a set of three rays 302 formed from a single camera point 300, the rays associating three landmarks: (X1,Y1,Z1), (X2,Y2,Z2) and (X3,Y3,Z3) with their corresponding image coordinates (i1, j1), (i2, j2) and (i3,j3) in camera space 304, according to the preferred embodiment of FIG. 2.

Reference is now made to both FIG. 2 and FIG. 3 with continued reference to FIG. 1. FIG. 2 shows a high-level flow diagram illustrating the preferred steps of method 200 enabling the construction of camera model 180, for a scene to be monitored, when landmarks contained in the scene are insufficient or not well scattered over the entire scene. In such instances, which are common in practice, supplementary landmarks in other camera views are preferably utilized to complete a suitable camera model 180. It is noted that, in general, the steps of method 200 are preferably undertaken as an off-line process.

In preferred step 201, camera 102 (see FIG. 1) is trained, tilted, and zoomed to a principal view of the scene to be monitored, as shown. The scene to be monitored preferably comprises at least two landmarks of known location (at least embodying herein obtaining from the single security surveillance camera, a principal camera image comprising a principal view of the at least one underlying terrain, the principal view comprising at least two located landmarks). Once the image is deemed satisfactory, the pan and tilt settings are recorded, as indicated in preferred step 202. The primary purpose for recording the pan and tilt settings (po and to) is so that camera 102 can be brought to the same attitude in space during run-time operation, namely, as camera model 180 is deployed for georeferencing (at least embodying herein recording for the principal view, positional data relating to the physical position of the single security surveillance camera in three-dimensional space, such positional data enabling subsequent reacquisition of the principal view by the single security surveillance camera). In general, recording of the zoom setting (zo) of camera 102 is not a compulsory requirement in the preferred method as the zoom setting of camera 102 is not varied during both the construction of most preferred embodiments of camera model 180, preferably including subsequent deployment of a model during georeferencing; however, the zoom setting (zo) of camera 102 may be recorded for reference purposes. Upon reading the teachings of this specification, those of ordinary skill in the art will now understand that, under appropriate circumstances, considering such issues as intended use, camera type, availability of PTZ features, etc., other recording arrangements, such as recording of zoom settings to allow reacquisition of a given view after camera maintenance, recording adjustments to camera height above the terrain, receiving and recording alternate or additional telemetry from the camera, etc., may suffice.

Preferably, principal nodelist 203A is created for each monitored camera view, as indicated in preferred step 203. Again, the camera view associated with the zone to be monitored (for example, primary region 110 of FIG. 1) is referred to as the principal camera view, and principal nodelist 203A comprises the data list associated with the principal camera view. Initially principal nodelist 203A is an empty record that is subsequently populated as described in the following steps.

In the next preferred step, user 150 visually associates each apparent landmark in a selected camera image with a respective landmark located on a Cartesian map (e.g., terrain model 107). Corresponding points, identified in both frames of reference (camera space and object space), are accumulated as "nodes" into principal nodelist 203A, as shown in FIG. 2, step 204. Upon reading the teachings of this specification, those of ordinary skill in the art will now understand that, under appropriate circumstances, considering such issues as scene to be monitored, advances in automated vision technology, etc., other landmark identification arrangements, such as the use of automatic identification processes, etc., may suffice. Preferably, a "node" associates the physical coordinates of a located landmark in the underlying terrain to pixel coordinates in a respective camera image. Preferably, nodes may also be derived through an interpolation of surrounding nodes, or may be derived from an existing camera model of the same camera.

Preferably, based on availability of landmarks, nodes are added, one at a time, to principal nodelist 203A. Step 204 preferably continues (repeats) until all available landmarks have been added to principal nodelist 203A, as shown (at least embodying herein generating a principal nodelist comprising all available principal nodes of the principal view). Preferably, once user 150 exhausts all usable landmarks of the scene, the adequacy of principal nodelist 203A is determined, in terms of the number and dispersion identified landmarks within the principal camera view, as indicated in preferred step 205. It is noted that when a principal scene has sufficient landmarks, a camera model 180 for georeferencing the principal view may be generated by a single fixed camera (as no additional view must be acquired).

If user 150 deems principal nodelist 203A to be inadequate (i.e., below the threshold of accuracy of user 150), preferred step 206 is entered wherein camera 102 is repositioned to a new camera view comprising a different geographic zone (for example, auxiliary region 113 of FIG. 1). This new camera view is identified herein as an auxiliary camera view. Preferably, auxiliary camera view may derive from any other pan or tilt position of camera 102. For example, a principal view to be georeferenced may preferably comprise a water scene containing sparse identifiable landmarks; the subsequent auxiliary camera view may preferably comprise a 180-degree pan rotation of the same camera to a landmark-rich portion of the adjoining shore. Preferably, additional landmark-derived nodes from one or more auxiliary camera views will be used to augment principal nodelist 203A, in subsequent steps.

Preferably, pan and tilt settings (po and to) for each auxiliary camera view are preferably recorded for identifying reference, as indicated in preferred step 207. Next, auxiliary nodelist 220A associated with the new auxiliary camera view is created in preferred step 220.

Preferably, based on availability of landmarks in the auxiliary camera view, nodes are added, one at a time, to auxiliary nodelist 220A, as indicated in preferred step 222. Preferably, the new auxiliary camera view must contain at least three landmarks of known location. The importance of this requirement will become apparent in a later section of the disclosure. Step 222 is preferably repeated until all the usable landmarks of a given auxiliary view are identified and added to auxiliary nodelist 220A, as shown. Once all landmarks of interest are processed, step 224 is entered.

In preferred step 224, nodes in the previously-deficient principal nodelist are preferably augmented by those of principal nodelist 203A, as indicate in preferred step 224. A detailed description of this preferred operation is deferred to FIG. 4A of this specification. Briefly stated, step 224 seeks to establish a set of alignment nodes common to both the principal and auxiliary views. Preferably, such alignment nodes, also referred to as alignment nodes, may comprise any suitable node pair in the auxiliary nodelist that share the same pixel coordinates with corresponding alignment nodes in the principal view (at least embodying herein deriving from both the a principal nodelist and the at least one auxiliary nodelist, at least two alignment nodes each one exhibiting respectively the same pixel coordinates in the auxiliary camera image as the pixel coordinates in the principal camera image). A preferred requisite of gaining landmarks from auxiliary views, for a given principal view, is that the alignment landmarks must be imaged at correspondingly identical pixel coordinates.

When an auxiliary view does not offer two real landmarks as alignment landmarks (i.e., two visible landmarks that are imaged at the same pixel coordinates as those of the principal view), then one or more "virtual" landmarks may be derived from the auxiliary nodelist. One preferred means for deriving such a virtual landmark is to seek three "real" landmarks in the auxiliary nodelist that yield a triangular element encompassing the pixel coordinates corresponding to the desired alignment landmark. Preferably, the virtual landmark is then provided by interpolation using the encompassing element. Furthermore, for an auxiliary camera view lacking such at least two alignment nodes, it is possible to locate within either the principal camera view or the auxiliary camera view, three nodes that together yield a triangular element encompassing the pixel coordinates of a located alignment node of the other view. Preferably, a virtual alignment node corresponding to the desired alignment node (such corresponding virtual alignment node exhibiting the same pixel coordinates to that of such alignment node of the other view) can be provided by interpolation.

Another preferred approach is to extract a required landmark from an existing camera model for a given camera view. This latter approach comprises a preferred method of camera model adaptation, as described in FIG. 9. Upon reading the teachings of this specification, those of ordinary skill in the art will now understand that, under appropriate circumstances, considering such issues as user preference, intended use, etc., other landmark provisions, such as placement of artificial landmarks within the underlying terrain (e.g., flags, markers, etc.), projection of artificial terrain points on the underlying terrain utilizing, for example, a laser projection, etc., may suffice.

Preferably, as indicated by the flow diagram of FIG. 2, augmentation of principal nodelist 203A with auxiliary node data is preferably repeated with as many additional auxiliary camera views as deemed necessary, until principal nodelist 203A contains a sufficiently dense and well scattered collection of landmarks, yielding a threshold level of accuracy acceptable to user 150 (yes decision at preferred step 205). The above-described augmentations to the data structure of principal nodelist 203A are necessary to support the constrained triangulations needed for subsequent mesh generation. Once principal nodelist 203A is acceptable to user 150, a finite element-like mesh-generation step is entered, as indicated in preferred mesh generation step 209.

Initially, knowledge of camera model 180 is confined to nodes established through preferred pairing of landmark coordinates in the camera and object spaces. The rationale for decomposing the image into triangular elements in mesh generation step 209 is to provide a mechanism for spatial interpolation so that the ray equations associated with additional camera resolution cells can be deduced from those of the observed nodes. Mesh generation is preferably confined to camera space and interpolation is preferably applied to ray parameters.

A preferred camera model 180, to be derived later, preferably comprises a set of rays with one ray associated with an individual image pixel. In mesh generation step 209, a ray is associated with each node of the incident nodelist. Such a ray is preferably represented by a line in three-dimensional space and a corresponding set of pixel coordinates. The equation of such line is preferably derived from coordinates of the camera point 300 and the (X,Y,Z) coordinates of the landmark, with each preferably extracted from the rectangular coordinate system of the underlying area (see FIG. 1 and FIG. 3).

Unlike some finite element problems, automatic node insertion is not preferred for mesh generation within mesh generation step 209. Initially, a convex hull is preferably defined to divide the nodes into a set of exterior nodes and a set of interior nodes (the exterior nodes reside on the convex hull while the interior nodes reside inside the convex hull). In mesh generation step 209, mesh generation is preferably confined to camera space and the generated mesh is preferably confined to the convex hull of the principal nodelist. The preferred mesh generation steps will be described using triangular elements as the preferred output.

Figure 8A:
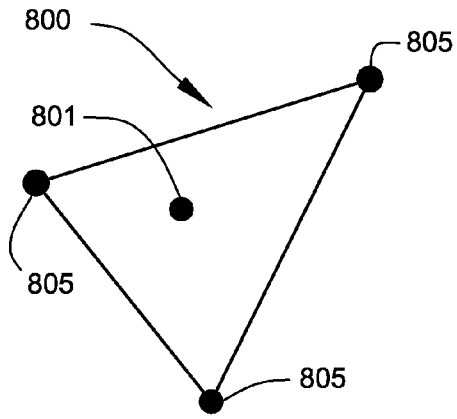
FIG. 8A and FIG. 8B show an encompassing triangular element resulting from a preferred mesh generation operation, according to a preferred embodiment of the present invention.
Figure 8B:
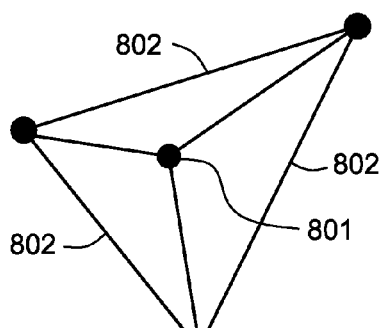

Preferably, external nodes of the convex hull are joined to yield a set of triangular elements with non-intersecting sides. Preferably, internal nodes 801 are sequentially examined by locating their encompassing triangular elements 800 and decomposing them into three smaller triangular elements 802, as shown in FIG. 8A and FIG. 8B. This preferred step is accomplished by connecting the internal node 801 to the vertices of the encompassing triangular element 800 and hence yielding three additional smaller triangular elements. Eventually, those elements that encompass other elements are invalidated and removed from element list 211A.

Thus, the preferred output of mesh generation step 209 is a collection of triangular elements, each one preferably identified by its three associated vertices. Preferably, once at least one element list 211A is attained, as shown in step 211, construction of camera model 180 for the respective view of camera 102 can preferably commence. Those of ordinary skill in the art will now understand that, under appropriate circumstances, considering such issues as construction preference, data distribution, etc., other methods of mesh generation, such as the use of geometric primitives other than triangular, use of hybrid meshes, the use of arbitrary or adaptive-meshing mythologies, etc., may suffice. It should also be noted that, preferably, all operations so far described can be performed as "off-line" processes.

The resulting output of mesh generation step 209 is preferably stored in at least one database, identified herein as element list 211A, as indicated in preferred step 211. Preferably, once element list 211A is attained, construction of camera model 180 commences in preferred step 212.

Issues associated with mesh quality in the above-described mesh-generation operation are preferably addressed by at least one mesh-refinement process. Mesh slivers occurring in the mesh often lead to inordinate inaccuracies that negatively affect downstream processes. Slivers (triangular elements exhibiting an excessively large or small angle) typically emerge in the triangular elements derived from the exterior nodes of the convex hull. It can be demonstrated that sliver patterns within the mesh change depending on the initial exterior node selected on the convex hull.

Mesh refinement within georeferencing system 100 preferably comprises the development and use of two or more element lists 211A, each one preferably based on the selection of a different initial exterior point of the convex hull. Thus, if the encompassing triangular element exhibits an excessively large or small angle, a search for a more favorable encompassing element is conducted in another element list 211A. The above-described optimization and refinement of finite-element mesh 209A preferably occurs prior to the ray-interpolation process described below.

Preferably, camera model construction is tantamount to computation of the ray equations for elemental nodes 805 of the derived triangular elements (that is, the nodes comprising the vertices of such triangular elements) and subsequently inferring the rays of the inside resolution cells from those of the encompassing elemental nodes by means of interpolation. More specifically, the elemental nodes 805, derived in mesh generation step 209 above, are interpolated to yield ray equations for resolution cells encompassed by a given triangular element. In this fashion, ray equations are preferably derived for the remaining image pixels. Preferably, a similar interpolation is applied when nodes from auxiliary views of camera 102 are used to reinforce the nodelist pertaining to a desired view of camera 102 (for example, when a corresponding alignment node within an auxiliary must be interpolated for a given alignment node of a principal view), as explained below.

If memory usage within the hardware environment is a constraining factor, construction of camera model 180 may preferably occur during runtime (at least embodying herein the step of reducing off-line processing requirements by deferring the mesh generation and subsequent construction of the camera model to the initiation of on-line operation). If memory usage is not a limiting factor within the hardware environment, off-line construction of camera model 180 can proceed in the preferred manner described herein.

To this end, it is preferred that a binary mask be employed to reflect which pixel coordinates supports a ray and which does not. Preferably, this mask image is then scanned, in a raster fashion, and wherever the mask pixel comprises a zero value, an attempt is made to locate an encompassing triangular element from element list 211A.

In more specific terms, since the convex hull does not necessarily extend to the entire image, a single bit-deep mask, preferably comprising the image width and height, is preferably used to establish the status of each pixel's coordinates, to readily determine whether it does or does not claim a ray. Preferably, for those pixel coordinates that do not, the process attempts to locate the encompassing triangular element, preferably by testing the content of element list 211A of step 211. If an exhaustive test of element list 211A does not yield an encompassing element, the pixel coordinate is preferably ascribed to a position outside of the convex hull (nodes beyond the convex hull do not comprise a ray and thus cannot lend themselves to georeferencing). Conversely, when the encompassing element for a given pixel coordinate is located, the ray equation is deduced through an interpolation process, as provided below.

Let $$X = A_i \cdot Z + B_i \quad (1)$$

$$Y = C_i \cdot Z + D_i \quad (2)$$

$$i = 1, 2, 3$$

preferably represent the rays associated with the vertices of the encompassing elements.

Preferably, the ray associated with the inside node is computed from the weighted sum of the three elemental surrounding nodes. The weights represent the influence of surrounding nodes on the internal node.

Now, let $w_i | i = 1, 2, 3$. preferably denote the weight due to surrounding elemental node i.

The ray equation for this inside node, namely $$X = A_o \cdot Z + B_o \quad (3)$$

$$Y = C_o \cdot Z + D_o \quad (4)$$

is preferably derived according to:

$$B_o = \frac{\sum_{i=1}^{3} w_i B_i}{\sum_{i=1}^{3} w_i} \quad (5)$$

where the $w_i$'s in equation (5) above can be derived from at least one interpolation scheme known to one of ordinary skill in the art. Again, the actual interpolation scheme selected is non-critical to the present method, although those presented herein are generally preferred.

Similarly, results are obtained for $D_o$.

Since the resultant ray is constrained to pass through the camera point, then $$A_o = \frac{X_c - B_o}{Z_c}$$

and $$C_o = \frac{Y_c - D_o}{Z_c}$$

where $X_c$, $Y_c$, $Z_c$ denote the camera point coordinates.

The result of the above-described operation may be viewed as a matrix of 4-tuples, or alternatively four image-size matrices, preferably retaining the ray coefficient at the respective pixel coordinates. Preferably, the number of rows of such matrices shall comprise the height of the image and their number of columns comprising the image width.

Preferably, once camera model 180 for a particular camera view is established, it can be utilized to relate pixel coordinates for the associated camera view to (X,Y,Z) coordinates in the respective scene. A preferred method for producing this result is traversing the ray from the camera point downwards along the Z-axis while extracting the (X,Y) coordinates of the ray from ray equations (3) and (4) above. Simultaneously, such extracted (X,Y) from equations (3) and (4) are preferably input into a terrain "module", such as terrain model 107 of FIG. 1, (or equivalent geographic database) that retrieves the altitude (i.e. the Z coordinate of the scene point at said X and Y coordinates). Preferably, such descent along the ray is continued until the Z-value of the ray equals that retrieved from the terrain model. Preferably, the (X,Y) coordinates corresponding to the resultant Z from the terrain model preferably define the object-space coordinates of the corresponding point to the pixel coordinates (at least embodying herein using such at least one camera model, mapping image coordinates to terrain coordinates by at least one third set of geometrical computations). The operation described above is tantamount to georeferencing coordinates of a pixel. Additional detail related to this preferred process, including the generation of an associated lookup table (LUT), is provided in the teachings of FIG. 7.

When memory use within the hardware environment poses no constraint, preferred step 214 is preferably undertaken. Step 214 preferably entails building of lookup tables (LUTs) relating the pixel coordinates, in camera space, directly to their corresponding X,Y,Z coordinates in object space, along with the respective range, where the range signifies the distance between the camera point and the respective object space point at (X,Y,Z). As shown in FIG. 2, the result is the (X,Y,Z,R) LUT identified herein as LUT 215.

The range of point (X,Y,Z), namely R, is readily computed from:

$$R = \sqrt{(X-X_c)^2 + (Y-Y_c)^2 + (Z-Z_c)^2} \quad (6)$$

The usefulness of LUTs in preferred implementations of georeferencing system 100 is focused to relieving on-line computation when necessary (for example, when the speed at which a target can be georeferenced is an overriding factor). The usefulness of LUTs is further described in the teachings of FIG. 7.

Again referring to the diagram of FIG. 2, if the scene of a given view offers landmarks in sufficient number and desired dispersion camera model 180 may be generated without seeking additional nodes from an auxiliary view. Preferably, such a camera model 180 may be generated using either a PTZ-enabled camera, or a fixed camera having only zoom capability. The preferred alternate method 250 of generating such a camera model 180 comprises the replacement of step 201 with step 201A preferably requiring only the zooming of camera 102 (in this preferred case a possibly fixed camera) to a principal view of the scene to be monitored, followed by replacement of step 202 with step 202A comprising the recording of the camera zoom settings. It is again preferred that, subsequent to acquiring the principal view, the same zoom setting be maintained throughout the operation (with such operation preferably extending to model construction and its deployment). It is noted that, when using a PTZ-enabled camera in conjunction with alternate method 250, it may be preferable to record all available camera settings to assist reacquisition of a view.

Figure 4A:
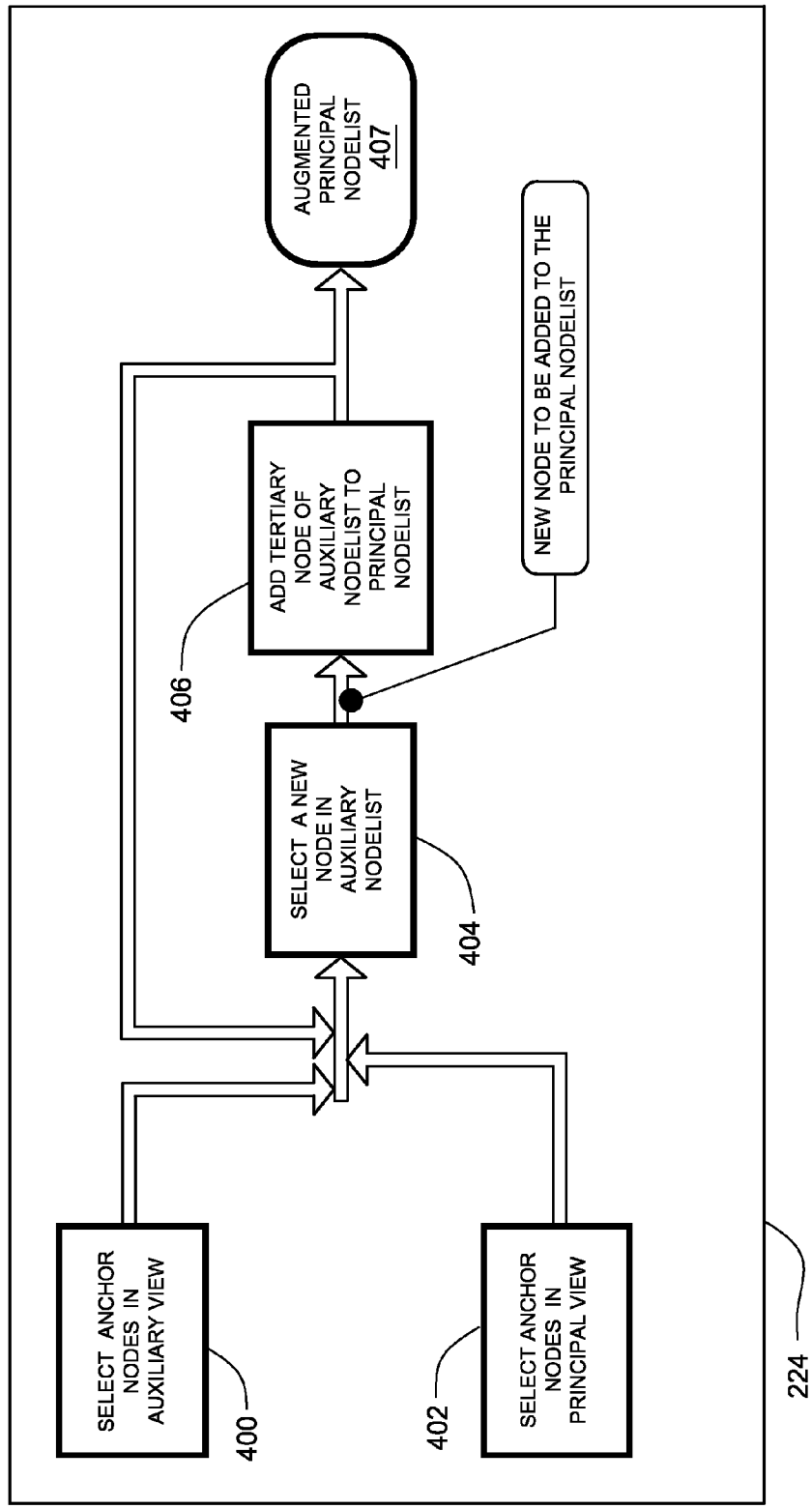
FIG. 4A shows a functional block diagram illustrating preferred steps in involved in adding an auxiliary nodelist to a principal nodelist.
Figure 4B:
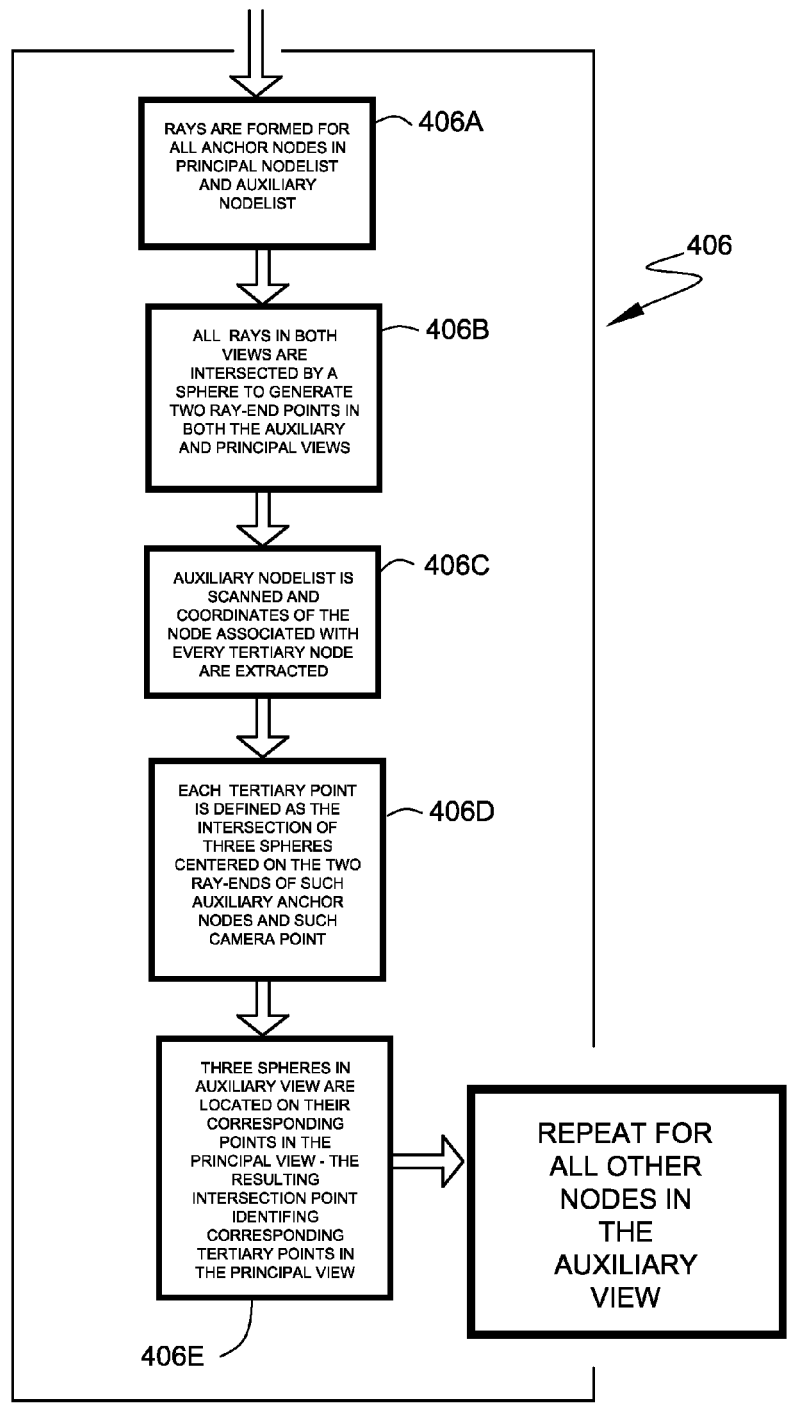
FIG. 4B shows a functional block diagram illustrating preferred steps in involved in the nodelist augmentation step of FIG. 4A.

FIG. 4A shows a functional block diagram illustrating the specific preferred processes involved in adding auxiliary nodelist 220A to principal nodelist 203A within step 224 of method 200. FIG. 4B shows a functional block diagram illustrating the preferred steps involved in the nodelist augmentation step 406 of FIG. 4A.

Figure 5:
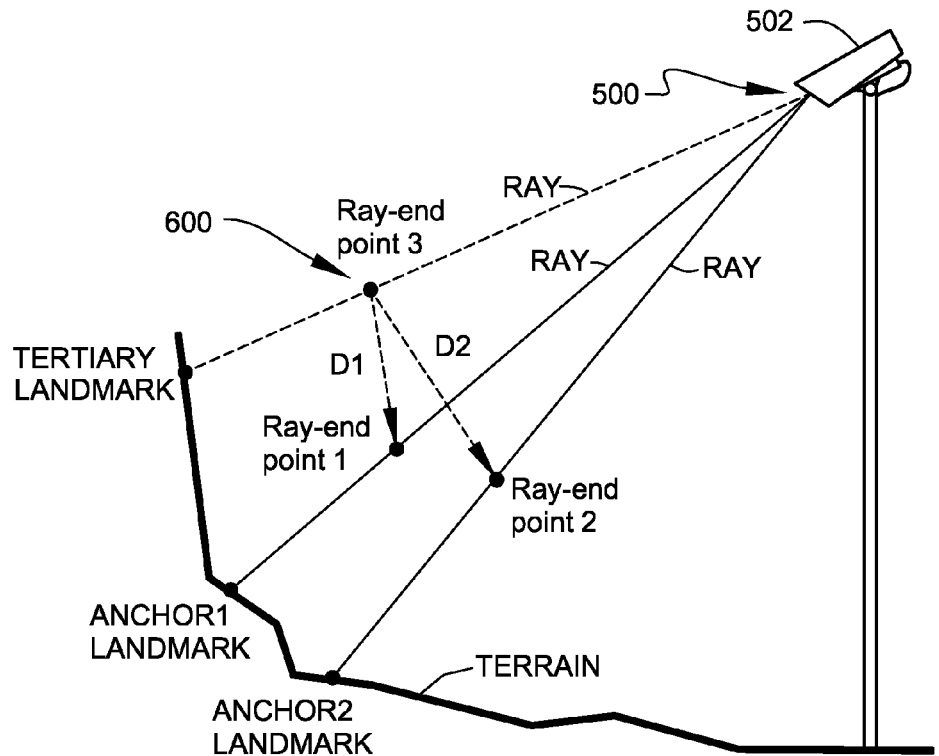
FIG. 5 and FIG. 6 show high-level schematic diagrams graphically illustrating how additional nodes from an auxiliary camera view can be used to augment those in a principal camera view, according to the preferred embodiment of FIG. 2.
Figure 6:
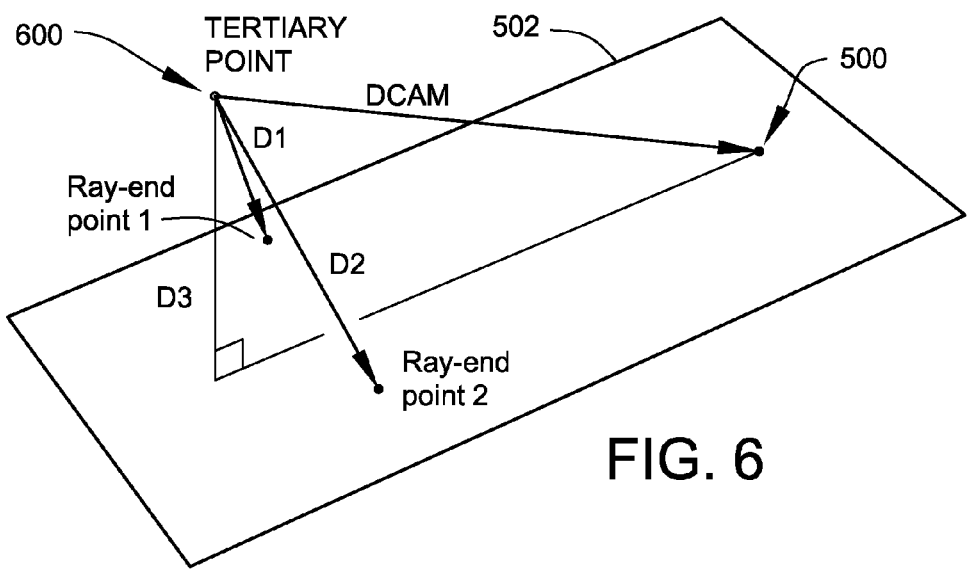

In presenting the preferred steps relating to the adding of auxiliary nodelist 220A to principal nodelist 203A, it is helpful to first make reference to diagrams of FIG. 5 and FIG. 6. Preferably, the ray-end point1, ray-end point2, and camera point 500 (of FIG. 6) define plane 502, as shown in FIG. 6. In reference to both FIG. 5 and FIG. 6, any third point (namely, ray-end point3) can be located uniquely in three-dimensional space in terms of its spatial relation with ray-end point1, ray-end point2, camera point 500, and plane 502, as shown. Preferably, the distances from tertiary point 600 to ray-end point1, ray-end point2, and camera point 500, along with the signed distance D3 of tertiary point 600 to plane 502 uniquely define the location of tertiary point 600 in three-dimensional space (within the first view of camera 502), as shown. In the preferred method described herein, ray-end point1 and ray-end point2 will be used for alignment of different camera views when camera 502 repositioned (for example, if driven to another view). Preferably, when a second view of the same camera 502, such as the principal camera view, offers corresponding ray-end point1 and ray-end point2 for alignment then the corresponding tertiary point can be derived for the new view. This approach enforces the same spatial relation that prevailed in the first view of camera 502.

Reference is again made to the functional block diagram of FIG. 4A. As noted above, step 224 of method 200 is equivalent to introducing additional landmarks into a camera view preferably derived from another view of the same camera. The following steps further define the preferred process.

In preferred step 400, two constituent nodes of auxiliary nodelist 220A are selected as auxiliary view alignment nodes. Preferably, alignment nodes are used for alignment of two nodelists of the same camera. Similarly, two constituent nodes of the principal nodelist are preferably selected as the alignment nodes of the principal nodelist, as indicated in preferred step 402. Preferably, alignment nodes in both auxiliary nodelist 220A and principal nodelist 203A must exhibit the same pixel coordinates. When such correspondence of alignment nodes is not forthcoming, the user preferably selects, as alignment nodes, those nodes in either nodelists that preferably comprise an encompassing element in the other. Preferably, such encompassing elements are used to derive at least one node, at desired image coordinates, through equation (5) above. Thus, steps 400 and 402 of FIG. 4A preferably yield two nodelists in which the alignment nodes are identified.

Next, a tertiary node (i.e., a node other than the two alignment nodes in auxiliary nodelist 220A) is selected, as indicated in preferred step 404. Preferably, such tertiary node is then added to principal nodelist 203A, as indicated in preferred step 406. Preferably, the process is repeated for all other nodes in the auxiliary view, as shown. The ultimate preferred intent of step 406 is to yield augmented principal nodelist 407, identified herein as augmented principal nodelist 407, as shown.

Reference is now made to FIG. 4B showing an expanded functional block diagram illustrating a preferred subset of steps within the nodelist augmentation step 406 of FIG. 4A. First, rays are preferably formed for all alignment nodes in the principal nodelist and auxiliary nodelist 220A as indicated in preferred step 406A. Next, all thus found rays in both views are preferably intersected by a sphere of fixed arbitrary radius, preferably centered on camera point 500 yielding two ray-end points in both the auxiliary and principal views, as indicated in preferred step 406B. Preferably, auxiliary nodelist 220A is then scanned and the respective 3-space coordinates of the node associated with every tertiary node, hereinafter referred as the tertiary points, are preferably extracted one by one, as indicated in preferred step 406C. Preferably, each thus extracted tertiary point in the above step 406C is preferably defined as the intersection of three spheres, each one respectively centered on the two ray-ends of such auxiliary alignment nodes and such camera point, with the aforementioned spheres having radii about equal to the distances of their centers to such tertiary point in the auxiliary view, as indicated in preferred step 406D (the above described arrangement is generally illustrated in FIG. 6, with D1, D2, and DCAM representing respective radii distances).

It is noted that the corresponding tertiary point in the principal view must exhibit the same spatial relation to the corresponding ray-end points in the principal view (along with the camera point), thus, by preferably locating the set of three spheres in the auxiliary view on their corresponding points in the principal view, and locating their intersection point in three-dimensional space, the corresponding tertiary points in the principal view are thus identified, as indicated in preferred step 406E. However, since inherent ambiguities may exist, due to the presence of a possible second intersection point, the signed distance D3 of the tertiary point from the plane formed by the camera point and the two ray-end points in the auxiliary and principal views are preferably used to disambiguate the result of step 406E (e.g., the signs of the integer values of the distances must match for both views). Preferably, as seen in FIG. 4A, step 406E is preferably repeated for all other nodes in the auxiliary view much in the same way as described for the tertiary point, as shown. Preferably, in this fashion, the principal view is effectively augmented by the nodes from nodelists of one or more auxiliary views of the same camera (the above-described processes at least embody herein; generating an augmented principal nodelist by adding the nodes of the at least one auxiliary nodelist to the principal nodelist using a first set of geometrical computations, wherein the augmented principal nodelist comprises at least one enlarged set of located landmarks associated with the principal view; and further embodying herein wherein such first set of geometrical computations further comprises the steps of: forming a ray extending from a virtual camera point to each such at least two alignment nodes of the principal nodelist and the at least one auxiliary nodelist; intersecting all the rays in the previous step by a sphere of fixed arbitrary radius, centered on the virtual camera point, to generate a plurality of ray-end points, such plurality of ray-end points comprising a first ray-end point and a second ray-end point in the auxiliary view, and a third ray-end point and a fourth ray-end point in the principal view, selecting within the auxiliary nodelist a tertiary node to be added as a corresponding tertiary node to the primary nodelist, such tertiary node comprising coordinates different from the first alignment node and, second alignment node; defining the tertiary node as the intersection of a first intersecting sphere-set comprising three spheres respectively centered on the first ray-end point, the second ray-end point, and the virtual camera point, wherein each sphere of the first intersecting sphere-set comprise radii equal to their respective distances extending from their centers to the tertiary point in the auxiliary view; applying to the principal view, a second intersecting sphere-set comprising three corresponding spheres respectively centered on the third ray-end point, the fourth ray-end point, and the virtual camera point, wherein each corresponding sphere of the second sphere set comprise radii equal to the spheres of the first intersecting sphere-set; identifying at least one possible tertiary point in the principal view by locating the resulting intersections of the three corresponding spheres of the second intersecting sphere-set; confirming the corresponding tertiary point in the principal view using the signed distance of the at least one possible tertiary point from a plane formed by the virtual camera point and the plurality of ray-end points in the auxiliary view and the principal view to disambiguate the result; adding the resulting corresponding tertiary point to the principal nodelist; and generating the an augmented principal nodelist by repeating the above steps for all other nodes in the auxiliary nodelist).

In an alternate preferred procedure of step 224, the number of alignment nodes used in the alignment of two nodelists, namely those due to the principal and auxiliary views (as described in step 224 of FIG. 2) are preferably increased from two to n. The motivation for such a preferred increase derives from the need to repeat the above-described preferred step of intersecting the three spheres of the ray-ends of the auxiliary alignment nodes and the camera point, as described in sub step 406D of step 406 (see FIG. 4B), and in connection with the preferred disambiguation processes, many times incommensurate with the combination of all alignment nodes taken two-at-a-time, thus leading to a multitude of solutions, an aggregate of which yielding the ultimate solution. Upon reading the teachings of this specification, those of ordinary skill in the art will now understand that, under appropriate circumstances, considering such issues as user preference, intended use, etc., other arrangements, such as the use of centroid-based schemes, etc., may suffice.

Figure 7:
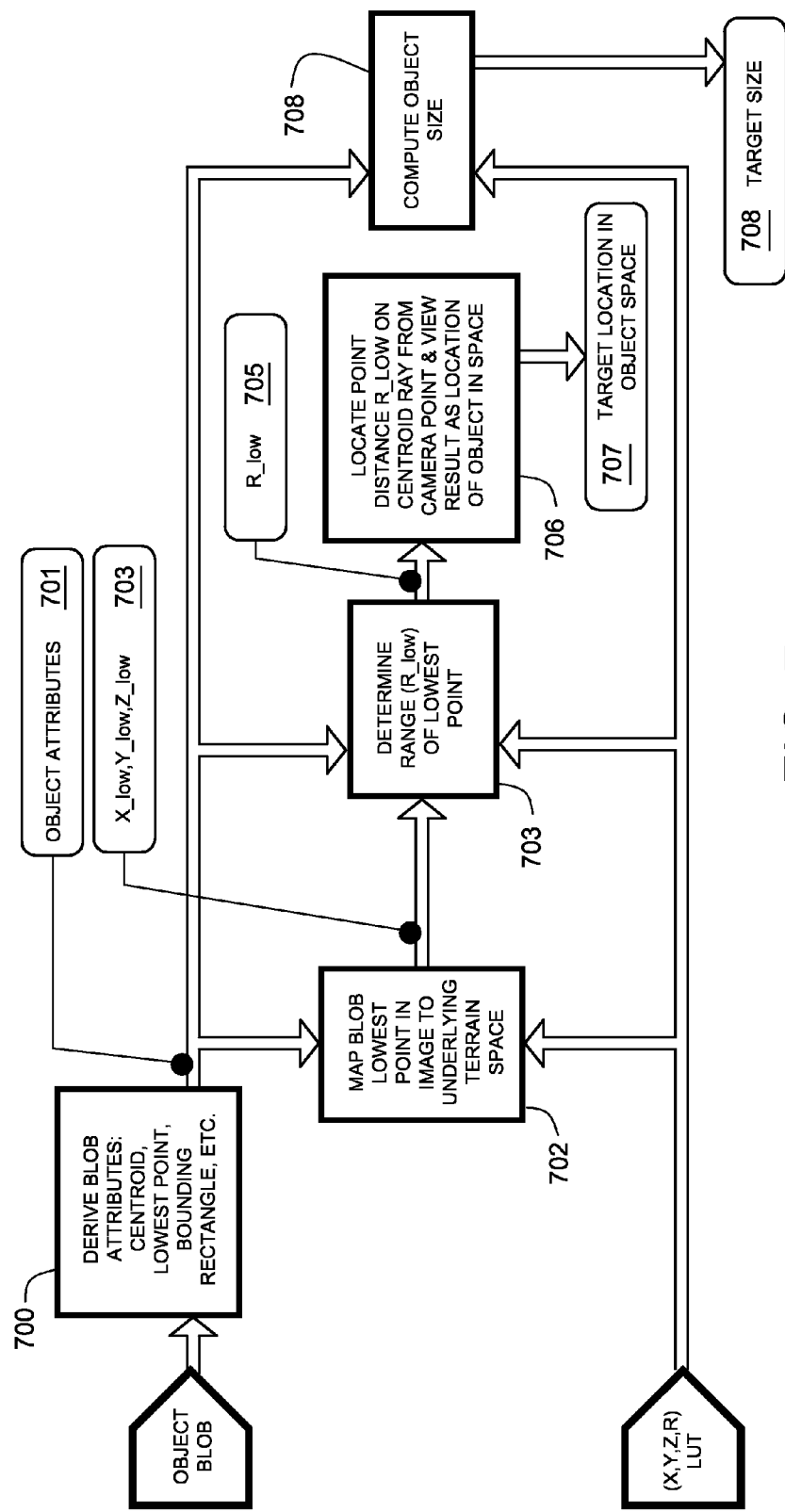
FIG. 7 shows a functional block diagram illustrating preferred steps for deploying a camera model during runtime to bring about georeferencing of a target located in the camera space, more specifically, the mapping of a point from camera space onto the underlying terrain space, according to a preferred embodiment of the present invention.

FIG. 7 shows a functional block diagram illustrating the preferred steps in deploying camera model 180, preferably during runtime, to bring about preferred georeferencing of a target located in the camera space, more specifically, the mapping of a point from camera space onto the underlying terrain space, according to a preferred embodiment of the present invention. Here, X,Y,Z preferably defines a right-handed coordinate system in object space, unless noted otherwise.

Preferably, as depicted in FIG. 7, after the image is segmented in camera space yielding "object blobs", a host of customary attributes, such as, for example, bounding box, centroid, lowest point, and pixel space area are preferably retrieved, as indicated in preferred step 700. It is noted that an object blob comprises a discrete region of camera space associated with a target of the camera view. The preferred output of step 700 is identified as object attributes 701, as shown (at least embodying herein at least one blob attribute). Preferably, the lowest point of each object blob is preferably georeferenced, as indicated in preferred step 702. This is preferably accomplished by viewing the lowest point of a segmented object (in camera space) as the point where the object touches the underlying terrain. In other words, the lowest point of the segmented object is presumed to be the point of supported contact between the object the underlying terrain (e.g., the foot of an upright human subject, a vehicle tire contacting a road surface, etc.).

Preferably, a previously generated (X,Y,Z,R) LUT (with "R" denoting the camera to terrain point range) is next used to map such "lowest point" to its corresponding object space point (X_low,Y_low,Z_low) 703, as shown. Next, as indicated in preferred step 704, the range of the thus located lowest-blob-point, R_low 705 is preferably retrieved from the (X,Y,Z,R) LUT (when such LUT data is available), otherwise it is preferably computed through the aforementioned eq. (6) and thus yielding R_low 705, as shown. In the subsequent preferred step 706, thus found range of such lowest-object-point R_low 705 is preferably assigned to all points of the blob, including its centroid. Preferably, the centroid of the blob is georeferenced by intersecting the ray (associated with the pixel coordinates of the blob centroid) with a sphere centered on the camera point, such sphere preferably comprising a radius equal to the range of such lowest-object-point, R_low 705. Such an intersection preferably yields two solutions; the solution with lower Z is preferably selected as the object's centroid location in the underlying terrain space. Preferably, the centroid Z is in turn fed into the respective ray equation to yield the corresponding X and Y coordinates of the centroid, preferably identified herein as centroid location 707. The above described steps at least embody herein; identifying in camera space, a target blob comprising a discrete region of camera space associated with the at least one target of the camera view; determining for the target blob, at least one blob attribute in camera space, such at least one blob attribute at least comprising pixel coordinates of a lowest blob point and pixel coordinates of a blob centroid point; mapping the pixel coordinates of such lowest blob point to a terrain point in object space; computing a range value R_low 705, comprising the distance from such terrain point to the virtual camera point; associating the same range value R_low 705 to the blob centroid point; intersecting the ray extending through the pixel coordinates of the blob centroid point with a sphere centered on the virtual camera point and comprising a radius equal to R_low 705 selecting from at least one resulting intersection of such ray, a ray-end point that exhibits the lowest Z coordinate value, wherein coordinates of such ray-end point comprise the location of the at least one target in object space).

Object size is also an important attribute in target classification. When it comes to assigning a real size to an object in preferred step 708, all points of an object in the terrain space are assumed to be at the same range R_low 705, of such lowest object point that meets the terrain. Preferably, a bounding box generally defining the boundary of the object in camera space is computed. Preferably, the four corners of such a bounding box are also assumed to be at the same range R_low 705, from the camera point. Preferably, projecting such four bounding box corners onto a sphere centered at the camera point and radius R_low 705, results in the preferred formation of a spherical quadrilateral, whose area (when preferably compared to that of the same bounding box in pixel space) provides a notion of average pixel size in terrain space, which in turn is preferably used to derive the underlying object-blob area (target size 709) in the terrain space.

In more specific terms, once the spherical quadrilateral is preferably generated by intersecting the rays associated with the four corners of the target bounding box (by the sphere of radius R_low 705 and centered on the virtual camera point), and both the number of pixels in the target bounding box and the number of pixels making up the object blob are determined in camera space, the relationship of camera pixels to real world scale is calculated. Preferably, this is accomplished by finding the mean frustum area associated with each pixel; by dividing the spherical quadrilateral area by the number of pixels in the bounding box and then multiplying the number of pixels claimed by (that is, contained within) the object blob in camera space by the equivalent mean frustum area associated with each pixel.

Preferably, after camera model 180 is derived for a particular view of a given camera, as described above, camera model 180 may be modified by another view of the same camera in an alternate preferred procedure of georeferencing system 100. Preferably, the target view, in this instance, need only exhibit a minimum number of two landmarks to be used as alignment nodes of the principal view. It has been determined that the problem of locating corresponding alignment nodes in the two camera views is somewhat relaxed when adapting camera model 180, as such an auxiliary view, which is much more likely to offer the corresponding alignment nodes.

Figure 9:
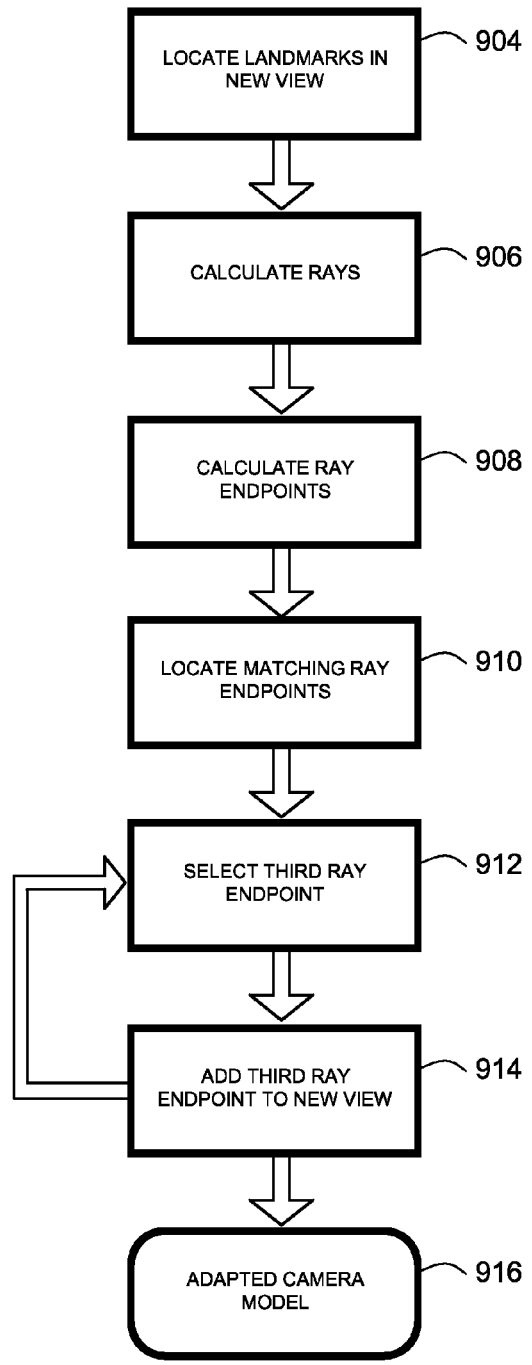
FIG. 9 shows a functional block diagram illustrating preferred steps in a preferred method of camera model adaptation, according to a preferred embodiment of the present invention.

Thus, as shown in FIG. 9, georeferencing system 100 comprises preferred method 900 for adapting an existing camera model, derived for a given camera view of a single camera 102, to a new camera view. Method 900 preferably comprises at least the steps noted in the following description.

First, as indicated in preferred step 904, a minimum of two landmarks are located in the new camera view. Preferably, such located landmarks will be used for alignment of the given camera view with the new camera view, for clarity, the two located landmarks are identified herein as a first located landmark and a second located landmark. Preferably, ray equations associated with the first located landmark and the second located landmark are derived for the new camera view, such ray equations outputting two respective rays, as indicated in preferred step 906.

Preferably, such two respective rays, along with all such rays of the existing camera model, are intersected by a sphere of arbitrary radius and centered on the virtual camera point to yield a first ray-end point and a second ray-end point respectively located at the end of each of the two rays, as indicated in preferred step 908. Preferably, two corresponding ray-end points, each one associated with the same pixel coordinates to those of the first ray-end point and the second ray-end point, respectively, are located in the given camera view, as indicated in preferred step 910. Preferably, a third ray-end point is selected and constrained to the intersection of three spheres, identified herein as a first intersecting sphere-set, as indicated in preferred step 912. Preferably, the three spheres of the first intersecting sphere-set are respectively centered on the first ray-end point, the second ray-end point, and the camera point. Preferably, each sphere of the first intersecting sphere-set comprise radii equal to a distance extending from their centers to the third ray-end point. Preferably, an identical three spheres, identified herein as a second intersecting sphere-set for clarity, is used to locate a corresponding third ray-end point in the new camera view. Preferably, the three corresponding spheres of the second intersecting sphere-set are respectively centered on the two corresponding ray-end points and the virtual camera point of the new view. Preferably, each corresponding sphere of the second intersecting sphere-set comprise radii equal to the respective spheres of the first intersecting sphere-set. Preferably, the corresponding spheres in the new view essentially "add" the corresponding third ray-end (along with its associated pixel coordinates) in the new view, as indicated in preferred step 914. Preferably, the result is disambiguated using the signed distance of the corresponding third ray-end to the plane formed by the camera point and the two corresponding ray-end points of the new view and the third ray-end point to the plane formed by the first ray-end point, the second ray-end point, and the virtual camera point. Preferably, steps 912 through step 914 are repeated for all other ray-end points of the given view, as shown, thus, a preferred adaptation of such existing camera model derived for a given camera view to a new camera view, is preferably achieved as indicated in preferred step 916.

Figure 10:
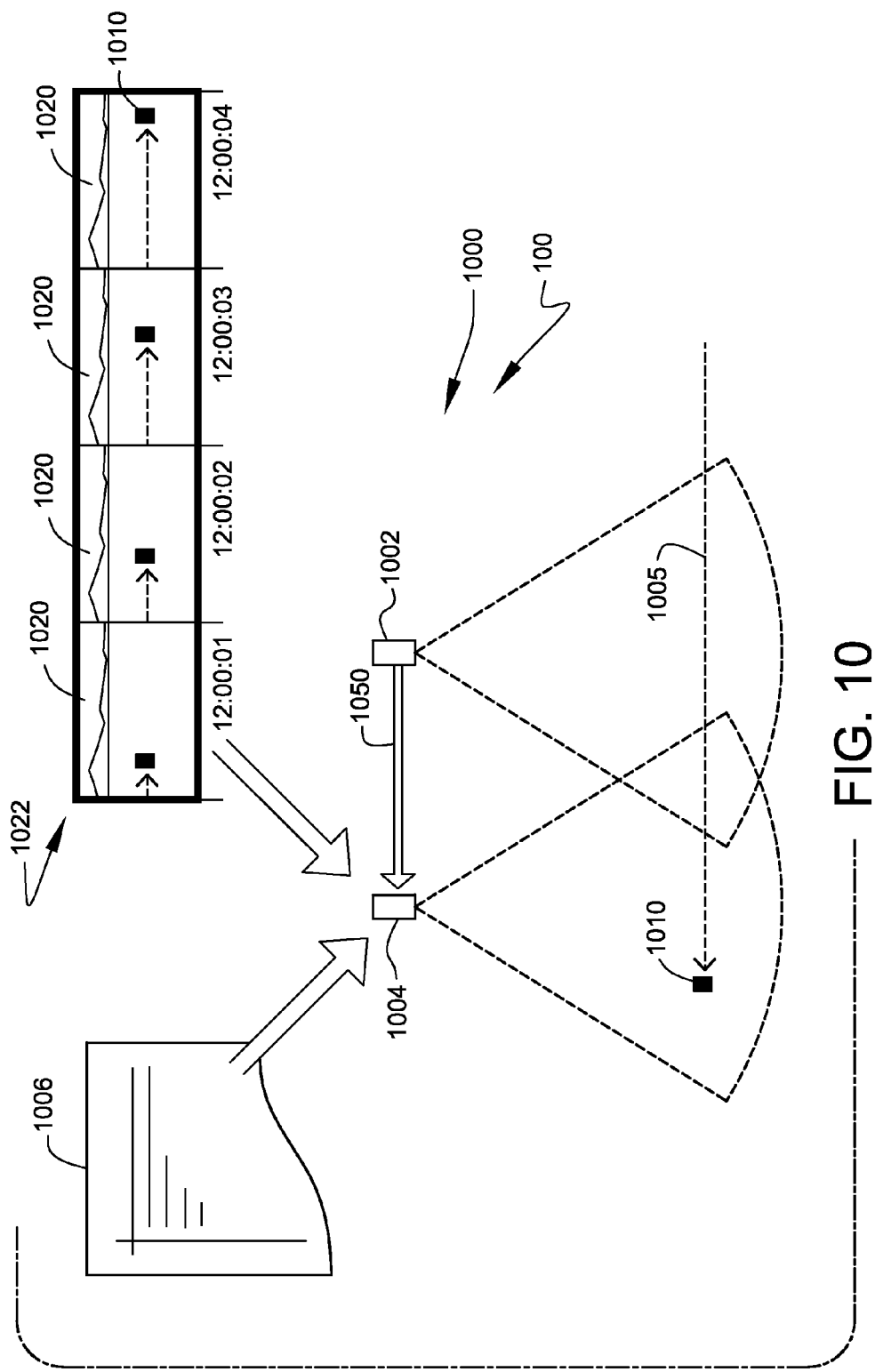
FIG. 10 shows a high level diagram illustrating a preferred method for implementing a camera hand-off between multiple georeferencing-enabled cameras, according to a preferred embodiment of the present invention.

FIG. 10 shows a high level diagram illustrating preferred method 1000 for implementation of a camera hand-off between multiple georeferencing-enabled cameras, according to the preferred embodiments of the present invention. Preferred implementations of georeferencing system 100 often comprise the use of multiple georeferencing-enabled cameras. In such a distributed-camera arrangement, it is often necessary to establish the relationship between camera spaces of adjacent cameras (for example, to assist essentially continuous tracking of target 1010 moving in the terrain, as it transitions between two georeferencing-enabled cameras).

The problem of camera hand-off between multiple georeferencing-enabled cameras of georeferencing system 100 is preferably addressed by communicating the terrain-space coordinates of target 1010 (located by source camera 1002) to destination camera 1004. This is preferably accomplished by initiating a search of the appropriate (X,Y,Z,R) lookup table 1006 by destination camera 1004. The search conducted by destination camera 1004 preferably locates the closest object-space point defined within (X,Y,Z,R) lookup table 1006, and derives the associated pixel coordinates in camera space of destination camera 1004. Preferably, the nature of the actual search conducted, which may preferably comprise a brute force search, is not critical to the above-described method. Preferably, using the above-described method, processing in the camera space of destination camera 1004 may be efficiently confined to only a small region surrounding the coordinates of an expected target. In this fashion, reacquisition of the same target 1010 is preferably facilitated by destination camera 1004. It is noted that the above-described implementation preferably operates within the overall hardware environment of FIG. 1.

Thus, according to preferred method 1000 at least one georeferenced target trajectory of source camera 1002 is communicated to destination camera 1004 such that the destination camera can calculate at least one row and at least one column number of a resolution cell in (X,Y,Z,R) lookup table 1006 that exhibits the closest three-dimensional point to the respective point of such communicated trajectory 1005. As noted above, such communication link 1050 between cameras assists reacquisition of target 1010 in camera space of destination camera 1004.

FIG. 10 further illustrates georeferencing of target 1010 in object space, in a plurality of time-stamped frames 1020 of at least one georeferencing-enabled video sequence 1022, to provide estimated true kinematics of target 1010 in terms of both real-world position and time. Preferably, use of time data imbedded in time-stamped frames 1020 of the georeferencing-enabled video sequence 1022 enables the calculation of real velocity and real acceleration for target 1010, based on a frame-by-frame observed change in target pixel coordinates. True kinematics of target 1010 are generated using the georeferencing enablements of the underlying camera model.

Although applicant has described applicant's preferred embodiments of this invention, it will be understood that the broadest scope of this invention includes modifications such as diverse shapes, sizes, and materials. Such scope is limited only by the below claims as read in connection with the above specification. Further, many other advantages of applicant's invention will be apparent to those skilled in the art from the above descriptions and the below claims.

What is claimed is:

1. A method of adapting an existing georeferencing-enabled camera model derived for a given camera view of a single security surveillance camera, to a new camera view of the single security surveillance camera, such existing georeferencing-enabled camera model relating image pixel-coordinates of the given camera view to rays in three-dimensional space, relative to a virtual camera point, such method comprising the steps of:

a) locating in the new camera view a minimum of two located landmarks to be used for alignment of the given camera view with the new camera view, such minimum of two located landmarks comprising a first located landmark and a second located landmark;

b) deriving for the new camera view, ray equations associated with the first located landmark and the second located landmark, such ray equations outputting two respective rays;

c) intersecting each such two respective rays, along with all such rays of the existing georeferencing-enabled camera model, by a sphere of arbitrary radius and centered on the virtual camera point to yield a first ray-end point and a second ray-end point respectively located at the end of each such two rays;

d) locating in the given camera view two corresponding ray-end points, each one associated with the same pixel coordinates to those of first ray-end point and a second ray-end point respectively;

e) locating in the given camera view a third ray-end point comprising the intersection of a first intersecting sphere-set comprising three spheres respectively centered on the first ray-end point, the second ray-end point, and the virtual camera point, wherein each sphere of the first intersecting sphere-set comprise radii equal to a distance extending from their centers to the third ray-end point in the given view;

f) using a second intersecting sphere-set to calculate a corresponding third ray-end point in the new camera view, the second intersecting sphere-set comprising three corresponding spheres respectively centered on the two corresponding ray-end points and the virtual camera point, wherein each corresponding sphere of the second intersecting sphere-set comprise radii equal to the respective spheres of the first intersecting sphere-set;

g) locating in the new view at least one corresponding third ray-end point along with its associated pixel coordinates in the new view;

h) confirming the corresponding third ray-end using the signed distance of the corresponding third ray-end to a plane formed by the virtual camera point and the two corresponding ray-end points of the new view and the third ray-end point to a plane formed by the first ray-end point, the second ray-end point, and the virtual camera point; and i) deriving such georeferencing-enabled camera model by repeating steps (e) through (h) for all other ray-end points of such given view;

j) wherein adaptation, of such existing georeferencing-enabled camera model derived for a given camera view to a new camera view, may be achieved.

* * * * *